United States Patent [19]

Bertsch-Frank et al.

[11] Patent Number: 5,250,280
[45] Date of Patent: Oct. 5, 1993

[54] METHOD OF PREPARING STORAGE-STABLE AQUEOUS SODIUM PEROXYMONSULFATE SOLUTIONS

[75] Inventors: Birgit Bertsch-Frank, Hanau; Axel Düker, Schleibheim; Friedrich Bittner, Bad Soden; Gert Rössler, Brühl, all of Fed. Rep. of Germany

[73] Assignee: Degussa Aktiengesellschahft, Fed. Rep. of Germany

[21] Appl. No.: 721,779

[22] Filed: Jun. 28, 1991

[30] Foreign Application Priority Data

Jun. 29, 1990 [DE] Fed. Rep. of Germany ....... 4020856

[51] Int. Cl.$^5$ .................. C01B 15/06; C01B 15/08
[52] U.S. Cl. .................................................. 423/513
[58] Field of Search .......................................... 423/513

[56] References Cited

U.S. PATENT DOCUMENTS

| 2,899,272 | 8/1959 | Flach et al. | 423/513 |
| 4,049,786 | 9/1977 | Chiang | 423/513 |
| 4,610,865 | 9/1986 | Reh et al. | 423/513 |

FOREIGN PATENT DOCUMENTS

| 553524 | 2/1958 | Canada | 423/513 |
| 553525 | 2/1958 | Canada | 423/513 |
| 567026 | 12/1958 | Canada | 423/513 |
| 967591 | 8/1964 | United Kingdom | 423/513 |
| 1442811 | 7/1976 | United Kingdom | 423/513 |

Primary Examiner—Gary P. Straub
Attorney, Agent, or Firm—Cushman, Darby & Cushman

[57] ABSTRACT

Previously known peroxymonosulfate solutions exhibit an unsatisfactory storage stability and/or can only be used with technical limitations. According to the invention, storage-stable, aqueous sodium peroxymonosulfate solutions can be prepared with a content of 5% to 50% by weight NaHSO$_5$ in an economic manner by means of the partial neutralization of a solution containing sulfuric acid and Caro's acid if a such a solution containing H$_2$SO$_4$ and H$_2$SO$_5$ is added which contains less than 3 parts by weight hydrogen peroxide per 100 parts by weight Caro's acid and the partial neutralization is carried out up to an equivalent proportion of total SO$_3$ to sodium ions in a range of 1 to 1 up to 1 to 1.3 and if the solution is diluted or concentrated as required.

8 Claims, No Drawings

METHOD OF PREPARING STORAGE-STABLE AQUEOUS SODIUM PEROXYMONSULFATE SOLUTIONS

The present invention relates to a method of preparing storage-stable, aqueous sodium peroxymonosulfate solutions which contain 5% to 50% by weight sodium peroxymonosulfate ($NaHSO_5$). These solutions are prepared by the partial neutralization of an aqueous solution containing Caro's acid ($H_2SO_5$) and sulfuric acid with sodium hydroxide or sodium carbonate.

BACKGROUND OF THE INVENTION

Peroxymonosulfuric acid (Caro's acid) and its salts (peroxymonosulfates) are becoming increasingly important as oxidation agents in the oxidative removal of pollutants from waste waters. Caro's acid is effective in such methods; however, it must be produced in situ or directly prior to being used because of its limited storage stability. The etching solutions containing Caro's acid for the production of printed circuits such as those described e.g. in European Patent Application EP-A 0 256 284 have limited stability as regards the available oxygen; under the indicated test conditions — 5 hours at 70° C. — the loss is approximately 15% if the solution used contains approximately 4.6% by weight peroxymonosulfuric acid. Thus, such solutions can not be marketed.

Even though peroxymonosulfates of the alkaline metals and alkaline-earth metals as well as of a few other metals and of ammonia are known — cf. German patent DE 10 80 083 —, only potassium peroxymonosulfate in the form of the storage-stable triple salt $2KHSO_5$ $KHSO_4$ $K_2SO_4$ and ammonium peroxymonosulfate in the form of a solution, the so-called "ammonium-stabilized Caro's acid", have become accepted in practice. However, since the above-mentioned potassium triple salt must generally be dissolved prior to use and the ammonium ion of the Caro's acid stabilized therewith must be considered itself as a critical component of waste water, there is a need for readily manageable and ecotoxicologically harmless, storage-stable peroxymonosulfate solutions. Absolute eco-toxicological safety could be expected from solutions containing sodium peroxymonosulfate.

According to the methods described in DE patent 10 80 083, metal monopersulfates are prepared by means of reacting Caro's acid or mixtures of Caro's acid and sulfuric acid with the hydroxides or carbonates of the metals concerned up to a pH of the reaction mixture of not more than 3. The reaction mixture which is obtained at first is transferred immediately after its preparation by means of vacuum drying or spray [flash]drying into a salt mixture containing the corresponding peroxymonosulfate. In order to obtain sufficiently storage-stable products, diluting agents with a stabilizing action are added preferably before or during the drying.

Solutions containing Caro's acid and sulfuric acid can be used in the method of DE 10 80 083 which were obtained either by means of electrolysis of a sulfuric acid with a content of preferably 35% to 50% by weight, with subsequent hydrolysis of the peroxodisulfuric acid formed or by means of the reaction of 50% to 88% by weight aqueous hydrogen peroxide with concentrated or fuming sulfuric acid (oleum). In order to prepare sodium peroxymonosulfate, such $H_2SO_5$/$H_2SO_4$ solutions are neutralized with a soda solution up to pH 2.9, freed of the precipitated Glauber salt and subsequently dried.

The method evaluated above for the preparation of solutions containing $NaHSO_5$ proved to be unsatisfactory because a considerable loss of available oxygen was observed during the neutralization —even in the relative example of DE 10 80 083, the yield of $NaHSO_5$ in the solution is indicated at only 85% of theory. In addition, the storage stability of the solution was unsatisfactory: The available oxygen content decreased to an intolerable degree and at the same time the solution was opacified again and again by precipitating Glauber salt. Obviously, the problems detected during the reworking of the method were also the cause for the fact that the usefulness of the solution was not pointed out anywhere in DE 10 80 083, but rather it was always concentrated by evaporation. However, the drying of the solution containing $NaHSO_5$ in order to obtain a storage-stable, solid product is associated with a further loss of available oxygen and is also expensive, which reduces the economic value of the process.

SUMMARY OF THE INVENTION

The object of the present invention is to provide a method of preparing storage-stable, aqueous sodium peroxymonosulfate solutions which does not have the disadvantages of the method disclosed in DE 10 80 083. The present invention seeks to provide a method which yields storage-stable solutions and minimizes the loss of available oxygen during the neutralization of the $H_2SO_5$/$H_2SO_4$ solutions.

These and other objects are achieved by a method of preparing storage-stable, aqueous sodium peroxymonosulfate solutions with a content of 5% to 50% by weight sodium peroxymonosulfate by means of the partial neutralization of a solution which contains Caro's acid ($H_2SO_5$) and sulfuric acid and which was obtained by means of reacting sulfuric acid or oleum with at least 50% by weight aqueous hydrogen peroxide or by means of the electrolysis of an at least 30% by weight aqueous sulfuric acid. The partial neutralization is accomplished by hydrolysis of the peroxydisulfuric acid formed, with sodium hydroxide or sodium carbonate at a temperature below 50° C. which is characterized in that such a solution containing Caro's acid and sulfuric acid is used which contains less than 3 parts by weight hydrogen peroxide per 100 parts by weight Caro's acid ($H_2SO_5$) and that the partial neutralization is carried out up to an equivalent proportion of total $SO_3$ to sodium ions in the range of 1 to 1 up to 1 to 1.3 and that, to the extent desired, the $NaHSO_5$ content is adjusted by means of diluting with water or by means of distilling off water under reduced pressure during or after the partial neutralization.

It has been found that both the yield of available oxygen during the partial neutralization of a sulfuric Caro's acid as well as the storage stability of the solution obtained containing sodium peroxymonosulfate as regards the available oxygen content depend to a significant degree on the content of hydrogen peroxide in the sulfuric Caro's acid solution used and in the sodium peroxymonosulfate solution. The lower the $H_2O_2$ content in the $H_2SO_5$/$H_2SO_4$ solution and in the $NaHSO_5$/$NaHSO_4$ is, the lower the losses of available oxygen in the partial neutralization and during storage. This behavior was not to have been expected previously. It is assumed based on analytic experiments regarding the method of the invention that hydrogen peroxide reacts during the neutralization stage, in part immediately, and somewhat more slowly during storage, with decomposition of $H_2SO_5$ and $NaHSO_5$, that one must start with an equimolar decomposition reaction.

If the equivalent proportion of the invention of total $SO_3$ to sodium ions is 1 to 1 up to 1 to 1.3, $NaHSO_5$ solutions with a pH of approximately 1 or below 1 are obtained from which practically no solid matter is separated during a storage of several weeks. The solutions prepared in accordance with the invention are therefore economical, that is, they can be prepared with a high yield of available oxygen and are marketable because of their high storage stability. The user of aqueous solutions containing peroxymonosulfate, e.g. for treating waste water for the oxidative removal of toxic wastewater contents, no longer needs to prepare such solutions himself immediately before use or to use solutions containing ammonia, but rather he can make use of the solutions of the invention, which are sufficiently storage-stable. In order to further increase the storage stability, known stabilizers for peroxymonosulfates can be added in an effective amount to the sodium peroxymonosulfate solutions prepared in accordance with the invention, during or after the preparation of the solutions, e.g. dipicolinic acid, stannates and chelate complexing agents, especially from the series of phosphonates such as hydroxyalkylidene diphosphonates, ethylene diamine tetra(methylene phosphonic acid) and diethylene triamine penta(methylene phosphonic acid). However, the solutions prepared in accordance with the invention are even much stable in the absence of such stabilizers than peroxymonosulfuric acid solutions with a comparable content of available oxygen.

Solutions with an equivalent proportion of total $SO_3$ to sodium ions of 1 to greater than 1.3 have a pH above 1 and are no longer sufficiently storage stable since solid matter precipitates —see Examples 12 to 14. The term "total $SO_3$" denotes that molar amount which is bound in the sulfuric Caro's acid used in the form of $H_2SO_5$, $H_2SO_4$ and $H_2S_2O_8$. The stability as regards the available-oxygen content decreases at an equivalent proportion of 1 to less than 1 since the low stability of the Caro's acid becomes increasingly apparent in this case —see Example 1.

The solutions containing Caro's acid and sulfuric acid and to be used in the method of the invention can be obtained in a known manner - see e.g. DE 10 80 083. There are essentially two potential methods, namely: 1) The reaction of concentrated sulfuric acid or oleum (solutions of $SO_3$ in sulfuric acid) with aqueous hydrogen peroxide and 2) The hydrolysis of an electrolytically produced, aqueous sulfuric solution containing peroxydisulfuric acid.

It is essential that only such solutions are to be supplied to the partial neutralization of the invention whose hydrogen peroxide content is less than 3 parts by weight, preferably less than 2.5 and especially less than 2 parts by weight per 100 parts by weight Caro's acid. It can be advantageous, depending on the intended use of the solution containing $NaHSO_5$, to use such $H_2SO_5/H_2SO_4$ solutions which exhibit not only as low an $H_2O_2$ content as possible but at the same time as low a peroxydisulfate content as possible, preferably below 5 parts by weight $H_2S_2O_8$ per 100 parts by weight Caro's acid. The selection of the suitable solution requires a knowledge of the available oxygen bound as $H_2O_2$, $H_2SO_5$ and $H_2S_2O_8$. The individual components can be readily determined potentiometrically using a cerium(IV)sulfate solution and sodium arsenite solution in the same specimen in succession: At first, the $H_2O_2$ content is determined by means of titration of a specimen with a $Ce(SO_4)_2$ solution; the value for the $H_2SO_5$ content is obtained after the addition of an excess of $NaAsO_2$ solution to the specimen titrated as described above and back titration with the $Ce(SO_4)_2$ solution; the $H_2S_2O_8$ content is obtained after a new addition of an $NaAsO_2$ solution in excess, 15 minutes of boiling and back titration with the $Ce(SO_4)_2$ solution. The same method of determination is also suitable for determining the content of the partially neutralized solutions.

It is possible to obtain $H_2SO_5$ solutions with a low $H_2O_2$ content by means of the hydrolysis of an electrolytically prepared solution containing $H_2S_2O_8$ however, the $H_2S_2O_8$ content is as a rule distinctly above 5, usually above 10 parts by weight per 100 parts by weight $H_2SO_5$. However, as the hydrolysis proceeds further, there is the danger of an increase of the $H_2O_2$ content and, in addition, a reduction of the available-oxygen content.

The reaction of hydrogen peroxide with sulfuric acid or oleum is an equilibrium reaction. It is possible, depending on the concentration of the reactants and the molar ratio selected, to obtain solutions with differing $H_2SO_5$ content and $H_2O_2$ residual content. Aqueous $H_2O_2$ solutions with an $H_2O_2$ content of at least 50 % by weight, especially 70 to approximately 85% by weight, as well as fuming sulfuric acid, also called oleum, with an $SO_3$ content of at least 20% by weight, preferably over 50% by weight, especially approximately 65% by weight are used in order to prepare solutions containing $H_2SO_5$ and $H_2SO_4$ with an $H_2O_2$ content below 3 parts by weight per 100 parts by weight $H_2SO_5$. The molar ratio of hydrogen peroxide to total $SO_3$ - sum of $SO_3$ and $SO_3$ bound as $H_2SO_4$ - is 1 to 1.1 up to 1 to 1.6. The concentration of $H_2O_2$ in the aqueous hydrogen peroxide, the concentration of $SO_3$ in the oleum as well as the molar ratio are to be coordinated in such a manner with each other that the molar ratio of the water bought with the aqueous hydrogen peroxide into the reaction system to the sulfur trioxide brought in with the oleum is less than 1; a molar ratio in a range around 0.8 is well suited. It is possible under the cited conditions to obtain in a high yield the solutions with an $H_2SO_5$ content of 50 - 65% by weight, an $H_2SO_4$ content of 20% to 40% by weight and an $H_2O_2$ content of less than 1.5% by weight, especially less than 1% by weight, which solutions are to be used with preference and which can be supplied directly or after partial dilution with water to the partial neutralization.

Sodium hydroxide solution or a soda solution are suitable for the partial neutralization. A sodium hydroxide solution with a content of 10%–50% by weight is preferred; insofar as highly concentrated $NaHSO_5$ solutions are desired, a sodium hydroxide solution in the upper concentration range is used. The neutralization heat is generally removed by cooling, so that a reaction temperature below 50° C., preferably below 35° C. is maintained. The cooling can be achieved by means of a customary cooling of the reactor, e.g. by means of heat exchangers or by means of evaporation cooling.

The method of the invention can be carried out either discontinuously or continuously. In the case of a continuous embodiment, the reaction is preferably carried out in a reaction loop. The loop contains a reactor, preferably a tubular reactor which is preferably equipped with mixing devices, e.g. one or several static mixers, at least one metering position for the sodium hydroxide solution or soda solution and the solution containing Caro's acid and an effective cooler; other components of the loop are a conducting main, equipped with a transport member, and a removal position for the partially neutralized sodium peroxymonosulfate solution. The sulfuric Caro's acid is metered into the partially neutralized solution of the desired concentration of $NaHSO_5$ and $NaHSO_4$ circulating in the loop in the first part of the reactor and is mixed with the circulating solution; sodium hydroxide solution is metered in at a position removed from the first metering position to obtain a sufficiently homogeneous mixture and is mixed. The reactor contents are maintained at a temperature of below 35° C. by means of external cooling or by means of an integrated vacuum evaporative cooler. The volume of the reaction loop is maintained constant by removing the partially neutralized solution from the reactor.

An important advantage of the method of the invention is the fact that it is possible to make available in an economic fashion storage-stable and thus marketable solutions with a content of 5% to 50% by weight, preferably 10% to 40% by weight and especially 15% to 35% by weight sodium peroxymonosulfate. Whereas during the previously known preparation of solutions containing $NaHSO_5$ for the purpose of drying the same, the yield of available oxygen decreased sharply even during the partial neutralization of the sulfuric Caro's acid, it is possible, according to the method of the invention, to obtain the desired solutions with a yield of available oxygen of in general over 90%. It is possible in the especially preferred embodiment in which an $H_2SO_5/H_2SO_4$ solution obtainable from 70% to 85% by weight hydrogen peroxide and 50% to 70% by weight oleum is partially neutralized, especially in the continuous method of operation presented, to maintain the available oxygen yield over 90% relative to hydrogen peroxide used. The satisfactory storage stability as regards the available oxygen content as well as the freedom from opacifying substances in the solutions prepared in accordance with the invention permits the elimination of the expensive and yield-reducing drying of the solutions for the purpose of obtaining a storage-stable $NaHSO_5$ product; in addition, no dissolving station is needed at the site of use.

DETAILED DESCRIPTION OF PREFERRED EMBODIMENTS

The invention and its advantages are disclosed further by means of the following examples and reference examples.

EXAMPLES 1 to 7

The aqueous hydrogen peroxide solution is placed in a flask provided with an agitator, a thermometer and external cooling. Sulfuric acid or oleum is added dropwise with strong cooling — reaction temperature 0° to 10° C. The molar ratio of $H_2O_2$ to the total $SO_3$, the concentrations of the reactants, the yield as well as the analyses of the $H_2SO_5/H_2SO_4$ solution obtained are given in Table 1a.

For partial neutralization, sodium hydroxide solution (37% by weight) and the $H_2SO_5/H_2SO_4$ solution prepared above are added in the indicated molar ratio via two dropping funnels into a flask equipped as above. A small amount of $NaHSO_5/NaHSO_4$ solution from a comparable preceding batch or water is placed in a receiver for the purpose of better temperature control and mixing. The reaction temperature is maintained at 25° to 35° C. The molar ratio of total $SO_3$ to NaOH, the analysis of the solution and the yield are given in Table 1b.

Examples 3 and 7 are in accordance with the invention; Examples 1, 2, 5 and 6 are partially outside of the molar ratios of the invention and/or contain too much $H_2O_2$ in the $H_2SO_5/H_2SO_4$ solution, which results in low yields during the partial neutralization and/or in insufficient storage stability.

Example 4 is based on the molar ratios of the invention; however, a precipitation of essentially sodium sulfate occurred on account of too strong a concentration by evaporation: Example 4 thus shows that there are limits to a concentration by evaporation with increasing Na excess in relation to the total $SO_3$.

TABLE 1a

Preparation and analysis of the $H_2SO_5/H_2SO_4$ solution

| Example No. | $H_2O_2$ (% by wt.) | Oleum (% by wt.) | Batch Molar Ratio $H_2O_2$: | Analysis $H_2SO_5$ (wt. %) | $H_2SO_4$ (wt. %) | $H_2S_2O_8$ (wt. %) | $H_2O_2$ (wt. %) | Yield % $H_2SO_5$ based on $H_2O_2$ |
|---|---|---|---|---|---|---|---|---|
| 1 | 70 | 65 | 1:1 | 65 | 16 | 1.2 | 6 | 77 |
| 2 | | | As in Example 1 | | | | | |
| 3 | 70 | 65 | 1:1.5 | 58 | 32 | 2.8 | 1.2 | 92 |
| 4 | | | As in Example 3 | | | | | |
| 5 | 70 | 20 | 1:1.3 | 49 | 30 | 1 | 5 | 74 |
| 6 | 85 | 0 (=$H_2SO_4$) | 1:1.3 | 49 | 30 | 1 | 5.5 | 74 |
| 7 | 70 | 65 | 1:1.54 | 56 | 33 | 2.8 | 1.0 | 92 |

TABLE 1b

Partial neutralization of the solutions of Table 1a

| Example No. | Molar ratio total $SO_3$: NaOH | Analysis (% by wt.) $NaHSO_5$ | $NaHSO_4$ | $H_2O_2$ | Yield % $NaHSO_5$ relative to $H_2SO_5$ added |
|---|---|---|---|---|---|
| 1 | 1:0.5 | 22 | 21 | 3.2 | 96 |
| 2 | 1:1.0 | 33 | 16 | 2.2 | 86 |
| 3 | 1:1.0 | 30 | 21 | 0.5 | 98 |
| 4 | 1:1.27 | 44 | not measured | 0.3 | 96**) |
| 5 | 1:1 | 25 | 20 | 2.0 | 85 |
| 6 | 1:1 | 28 | 20 | 2.5 | 87 |
| 7 | 1:1 | 30.5 | 22 | 0 | 95 |

*)The solution contains in addition 18% by weight $H_2SO_5$ and 9% by weight $H_2SO_4$; in spite of the high $H_2O_2$ content, the yield was high; however, the solution was insufficiently storage-stable - loss of $HSO_5^-$ within one week 20° C. 41.5% of the initial value.
**)The partial neutralization took place under reduced pressure and evaporation of water, at which time some solid precipitated (the analysis refers to the filtrate).

EXAMPLES 8 and 9

In order to illustrate the influence of the hydrogen peroxide content on the yield during the partial neutralization and to illustrate the storage stability, 4.5% by weight hydrogen peroxide was added to the batch of Example 7 immediately before the partial neutralization (Example 8).

3% by weight hydrogen peroxide was added to the solution of Example 7 after the end of the partial neutralization (Example 9). The results, $NaHSO_5$ content and $H_2O_2$ content immediately after the preparation of the solutions including the additional addition of $H_2O_2$ and after 1 week of storage at room temperature, as well as yield and residual value of $NaHSO_5$ relative to $H_2SO_5$ added in the partial neutralization are given in Table 2.

TABLE 2

| Example No. | $NaHSO_5$ (% by wt.) | $H_2O_2$ (% by wt.) | Yield of $NaHSO_5$ (% relative to $H_2SO_5$ added) |
| --- | --- | --- | --- |
| 7 after preparation | 30.5 | 0 | 95 |
| after 1 week | 30.0 | 0 | 94 |
| 8 after preparation | 24.5 | 2.2 | 81 |
| after 1 week | 16.0 | 0 | 53 |
| 9 after preparation | 28.6 | 3.1 | 94 |
| after 1 week | 21.7 | 1.5 | 71 |

EXAMPLES 10 and 11

The test apparatus for the partial neutralization consisted of a multi-neck flask with inner thermometer, agitator, distillation bridge with receiver, vacuum pump as well as two pumps for very precise metering of the reaction components into the multi-neck flask.

An aqueous $H_2SO_5$ /$H_2SO_4$ solution, prepared according to the data in Example 1, and a 37% by weight sodium hydroxide solution are fed, in the desired amount ratio, in a continuous manner, into 100 ml water in the flask. A reaction temperature of 25° to 35° C. is maintained via the vacuum system at a pressure in the range of approximately 10 to 30 mbars; at the same time, the water supplied with the raw materials and produced during the neutralization can be removed in order to obtain the desired concentration of $NaHSO_5$. A partial current can be removed from the flask in order to maintain the volume of reaction mixture constant; this was not done, however, in Examples 10 and 11. The batch amounts and analyses as well as the yields are given in Table 3.

The loss of available oxygen during storage at room temperature of the solution of Example 10 containing sodium peroxymonosulfate and prepared in accordance with the invention is approximately 1.7% each 10 days during the 40 days of testing.

TABLE 3

| | Example 10 | Example 11 |
| --- | --- | --- |
| Batch for $H_2SO_5$/$H_2SO_4$ solution | | |
| Conc. $H_2O_2$ (% by weight) | 69 | 69 |
| Conc. oleum (% by weight) | 65 | 65 |
| Molar ratio $H_2O_2$:total $SO_3$ | 1:1.54 | 1:1.54 |
| Analysis of the $H_2SO_5$/$H_2SO_4$ solution | | |
| $H_2SO_5$ (% by weight) | 55.5 | 56.3 |
| $H_2O_2$ (% by weight) | 0.95 | 0.96 |
| $H_2S_2O_8$ (% by weight) | 3.2 | 3.4 |

TABLE 3-continued

| | Example 10 | Example 11 |
| --- | --- | --- |
| Partial neutralization | | |
| Molar ratio Total $SO_3$:NaOH | 1:1.23 | 1:1 |
| Amount $H_2SO_5$/$H_2SO_4$ solution (g/h) | 100 | 100 |
| Sodium hydroxide solution (g/h) | 110.5 | 89.6 |
| Analysis of the $H_2SO_5$/$H_2SO_4$ solution | | |
| $NaHSO_5$ (% by weight) | 26.97 | 30.45 |
| $NaHSO_4$ (% by weight) | 10.11 | 22.18 |
| $H_2O_2$ (% by weight) | 0.02 | 0.02 |
| Yield of $NaHSO_5$ relative to $H_2SO_5$ added | 94.3 | 95.0 |

EXAMPLES 12 to 14

An aqueous $H_2SO_5$ /$H_2SO_4$ solution was partially neutralized according to the method of Examples 1 to 7. 70% by weight $H_2O_2$ and 65% by weight oleum were added; the molar ratio of $H_2O_2$ to the total $SO_3$ was 1 to 1.16. The partial neutralization with 37% by weight sodium hydroxide solution took place up to the pH indicated in the Table (measured with a glass electrode and pH meter). The resulting molar ratios of total $SO_3$ to NaOH and the yields of $NaHSO_5$ relative to added $H_2SO_5$ are given in Table 4.

TABLE 4

| Example No. | Molar ratio total $SO_3$:NaOH | pH | Yield % $NaHSO_5$ based on $H_2SO_5$ |
| --- | --- | --- | --- |
| 12 | 1:1.30 | 1 | 96.80 |
| 13 | 1:1.36 | 2 | 93.40 |
| 14 | 1:1.39 | 3 | 85.68 |

Example 12 is within and Examples 13 and 14 outside of the limits of the invention. In Examples 13 and 14, solid matter precipitates during the partial neutralization as well as during storage.

EXAMPLE 15

An $NaHSO_5$ solution prepared in a manner analogous to Example 11 but with a higher concentration was diluted by means of the addition of water to various concentrations of $NaHSO_5$. The storage stability was determined by storing 5 hours at 70° C. Table 5 shows the concentrations of the solutions of $NaHSO_5$ as well as the loss of available oxygen (AO loss) in % from the initial value.

TABLE 5

| Concentration of $NaHSO_5$ (% by weight) | AO loss (%) |
| --- | --- |
| 5 | 1.5 |
| 10 | 4.2 |
| 15 | 5.0 |
| 20 | 7.7 |
| 25 | 10.8 |
| 30 | 14.0 |
| 35 | 21.5 |

What is claimed is:
1. A method for preparing aqueous sodium peroxymonosulfate ($NaHSO_5$) solutions which are storage-stable to the extent that no solid matter is separated and the loss of available oxygen is not more than 1.7% based on the initial value, during storage of 10 days at room temperature, and which have a content of 15% to 35% by weight sodium peroxymonosulfate by means of the partial neutralization of an aqueous solution, which contains Caro's acid and sulfuric acid and which was obtained by means of reacting sulfuric acid or oleum with at least 50% by weight aqueous hydrogen peroxide or by means of the electrolysis of an at least 30% by weight aqueous sulfuric acid with subsequent hydrolysis of the peroxydisulfuric acid formed, with sodium hydroxide or sodium carbonate at a temperature below 50° C.;

a solution containing Caro's acid ($H_2SO_5$) and sulfuric acid being used which contains less than 2 parts by weight hydrogen peroxide per 100 parts by weight Caro's acid ($H_2SO_5$) and the partial neutralization being carried out up to an equivalent proportion of total $SO_3$ to sodium ions in the range of 1 to 1 up to 1 to 1.3, the total $SO_3$ denoting that molar amount which is bound in said Caro's acid and sulfuric acid containing solution to be partially neutralized in the form of $H_2SO_5$, $H_2SO_4$ and $H_2S_2O_8$.

2. A method as set forth in claim 1 in which a solution containing Caro's acid and sulfuric acid is used which was obtained by reacting approximately 70 to approximately 85% by weight aqueous hydrogen peroxide with oleum with an $SO_3$ content of at least 20% by weight $SO_3$, in a molar ratio of hydrogen peroxide to total $SO_3$ of 1 to 1.1 up to 1 to 1.6.

3. A method as set forth in claim 2 in which the $SO_3$ content of the oleum is over 50% by weight.

4. A method as set forth in claim 2 in which the solution which is supplied to the partial neutralization contains 50% to 65% by weight Caro's acid and 20% to 40% by weight sulfuric acid and less than 1.5% by weight hydrogen peroxide.

5. A method as set forth in any one of claims 1 to 4 in which the partial neutralization is carried out with a 10% to 50% by weight sodium hydroxide solution at a temperature of at the most 35° C.

6. A method as set forth in any one of claims 1 to 4 in which the partial neutralization is carried out in a continuous manner in a reaction loop whose reactor is equipped with a effective cooler, at least one metering position for the solution containing Caro's acid and at least one metering position for sodium hydroxide solution, the loop being equipped with a transport member and a removal position for the reaction solution circulating in the reaction loop and containing sodium peroxymonosulfate, and the metering positions for sodium hydroxide solution being arranged at such a distance from the metering positions for the solution containing Caro's acid that the Caro's acid added to the loop is mixed in an essentially homogeneous manner with the reaction solution in the loop before the sodium hydroxide solution is added.

7. A method as set forth in claim 5 in which the partial neutralization is carried out in a continuous manner in a reaction loop whose reactor is equipped with a cooler, at lest one metering position for the solution containing Caro's acid and at least one metering position for sodium hydroxide solution, the loop being equipped with a transport member and a removal position for the reaction solution circulating in the reaction loop and containing sodium peroxymonosulfate, and the metering positions for sodium hydroxide solution being arranged at such a distance from the metering positions for the solution containing Caro's acid that the Caro's acid added to the loop is mixed in an essentially homogeneous manner with the reaction solution in the loop before the sodium hydroxide solution is added.

8. A method as set forth in claim 1 including the step of adjusting the $NaHSO_5$ content by means of diluting with water or by means of distilling off water under reduced pressure during or after the partial neutralization, the final $NaHSO_5$ content being in the range of 15-35% by weight sodium peroxymonosulfate.

* * * * *